May 10, 1927.
E. S. SARGENT
1,628,615
TOGGLE SPREADER
Filed June 11, 1925
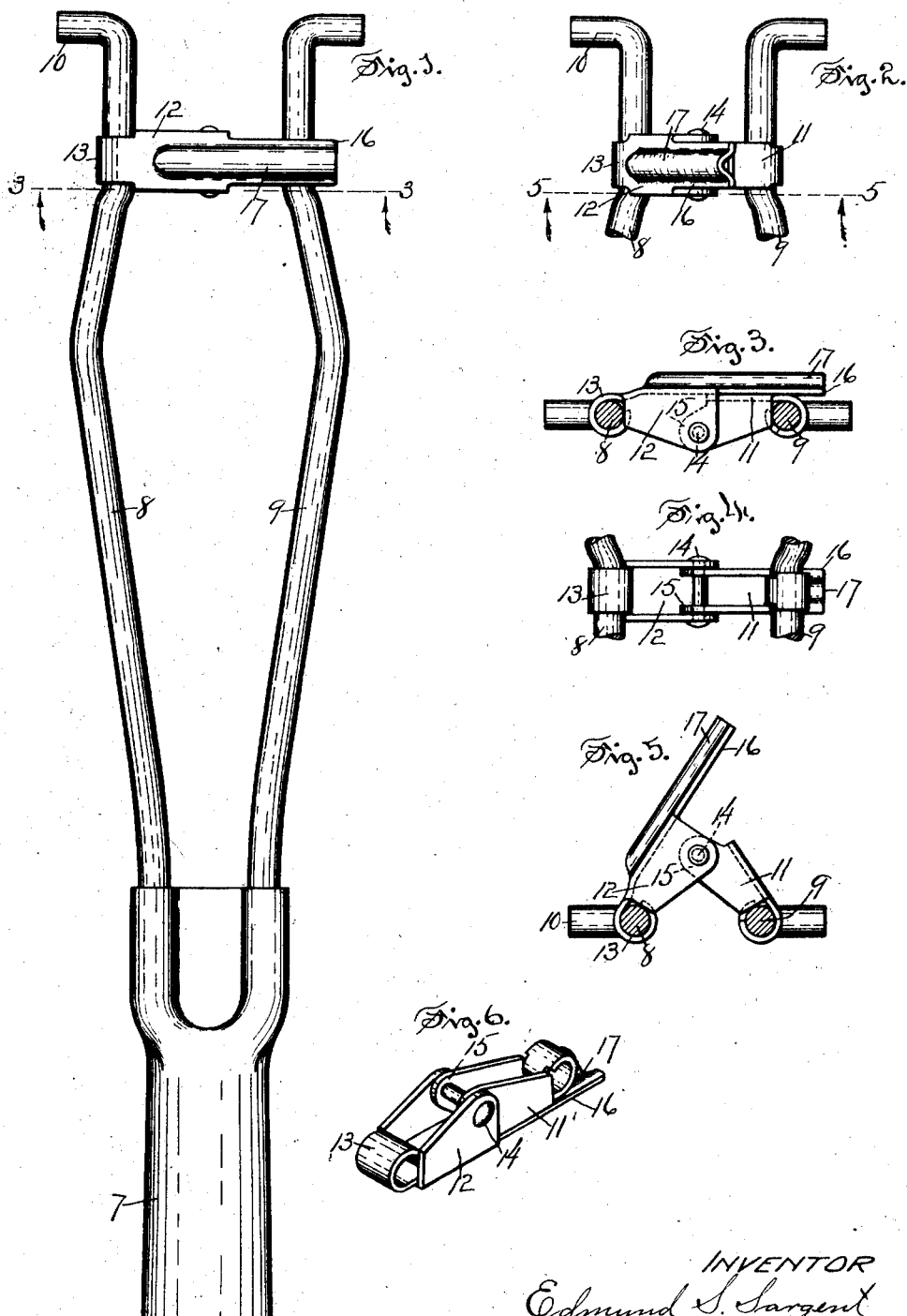
INVENTOR
Edmund S. Sargent.
by
Arthur B. Jenkins,
ATTORNEY Patented May 10, 1927.

1,628,615

UNITED STATES PATENT OFFICE.

EDMUND S. SARGENT, OF WINDSOR, CONNECTICUT, ASSIGNOR TO THE FULLER BRUSH COMPANY, OF HARTFORD, CONNECTICUT, A CORPORATION OF CONNECTICUT.

TOGGLE SPREADER.

Application filed June 11, 1925. Serial No. 36,559.

My invention relates to the class of devices that are employed for holding members in spaced relation, and commonly for moving such members apart to place them in such spaced relation, and an object of my invention, among others, is the production of a device of this kind that shall be simple in construction and particularly efficient for the purposes for which it is designed.

A toggle spreader embodying my invention, and in the construction and use of which the objects herein set out, as well as others, may be attained, is illustrated in the accompanying drawings, in which—

Figure 1 is a view of a spring connection commonly employed for receiving a supporting handle at one end and for supporting a brush or other cleaning implement attached to its other end, and having my improved spreader shown in its operative position to separate and hold the arms in spaced relation.

Figure 2 is a view of that end of the structure shown in Fig. 1 equipped with said spreader, the latter being shown in its ineffective position, that is, in a position with the members to which the spreader is secured nearer together than in Fig. 1.

Figure 3 is a view in section on a plane denoted by the dotted line 3—3 of Fig. 1.

Figure 4 is a detail view of a portion of the structure shown in Fig. 1 and with the parts in the same position, but showing the reverse side of the spreader from that shown in Fig. 1.

Figure 5 is a detail view in section on a plane denoted by the dotted line 5—5 of Fig. 2.

Figure 6 is an isometric view of the spreader looking at the under side.

While my invention is not limited in its uses to any particular kind of a structure, yet as I have successfully demonstrated its purpose in connection with means for supporting brushes or other cleaning implements, I have selected such for the purpose of illustrating my invention in the drawings herein, in which the numeral 7 indicates a socket piece as commonly formed at one end to receive a handle and that has spring arms 8—9 secured to and projecting therefrom, these arms being united by a bow at one end and within the socket piece. The outer ends of the arms are provided with pivots 10 that are, in the case of the structure herein shown, received in openings in a brush or other cleaning implement frame. The openings to receive the pivots are located a greater distance apart than are the ends of the pivots when the spring arms are in their normal or unsprung condition, and as shown in Fig. 2, and when the pivots are in place and engaged within said openings the arms are sprung apart and there held, as shown in Fig. 1 of the drawings.

My improved toggle comprises two toggle members 11—12, each having a loop 13 at one end and each being engaged at its opposite end with a pivot 14 that unites the two toggle members and forms the knuckle of the toggle joint.

These two members are each preferably of trough shape and may be formed of sheet metal that may be readily bent into such trough shape, the ends of those portions comprising the bottoms of the troughs being extended and bent to form loops 13, and as shown in Fig. 5. One of the members, as 12, is a little wider than the member 11, so that ears 15 on the member 11 are located between the sides of the member 12, the pivot 14 passing through said ears. The member 12 has a finger 16 projecting from that end opposite the loop 13, said finger overlying and resting against the top of the member 11 when the spreader is in its stretched position, and as shown in Figs. 1 and 3, in which position the pivot 14 has been moved to a point beyond a straight line extending through the axial centers of the arms 8 and 9, whereby the spring tension of said arms operates to retain the toggle in such stretched position, but as soon as the pivot 14 is moved to the opposite side of said line, as by force applied to the finger 16, away from the member 11, the spring tension in the arms 8 and 9 will force said toggle to its unstretched position, and as shown in Fig. 5 of the drawings.

In order that the finger 16 may be stiff enough to provide the requisite strength for its operation, it is formed with a rib 17 extending lengthwise thereof and onto the main part of the member 12.

The spreader shown therein provides a structure that is extremely simple and that may be provided at a low cost, and, moreover, it provides such a spreader that is very strong and well able to withstand the uses to which it may be put.

In accordance with the provisions of the patent statutes I have described the principles of operation of my invention, together with the device which I now consider to represent the best embodiment thereof, but I desire to have it understood that the device shown is only illustrative and that the invention may be carried out by other means and applied to uses other than those above set out.

I claim—

1. A cleaning implement support comprising two spring arms normally in disengaged condition with respect to the implement and adapted to be moved apart to engage the implement, a spreader comprising two members each pivotally attached at one end to one of said arms and at their opposite ends pivotally connected to each other to separate said arms and retain them in spaced relation, said members being arranged to permit the pivot connecting them to pass to opposite sides of a line passing through the pivotal connections of the members to said arms, and means for limiting the movement of said members after the pivot has passed to one side of said line, whereby said arms are retained in spaced apart relation.

2. A cleaning implement support comprising two spring arms normally in disengaged condition with respect to the implement and adapted to be moved apart to engage the implement, a toggle spreader comprising two members, each pivotally attached to one of said spring arms, a pivotal connection for said members at their adjacent ends, said members being arranged to permit the pivot connecting them to pass to opposite sides of a line passing through the pivots at their ends, and a finger projecting from one of said members to overlie and engage the other member to limit the swinging movement of said members after the pivot connecting them has passed said line, said finger being extended into space beyond the spring arms and thereby arranged to be grasped for the purpose of opening said members.

3. A cleaning implement support comprising two spring arms normally in disengaged condition with respect to the implement and adapted to be moved apart to engage the implement, said support also including a toggle spreader comprising two members pivotally mounted at their opposite ends upon said spring arms and both of trough shape with ears on the sides of one located between the side parts of the other, a pivot passing through said ears to pivotally connect said members at their adjacent ends, said members being arranged to permit the pivot connecting them to pass to opposite sides of a line extending through the pivots at their opposite ends, a finger comprising an extension from one of said members to engage the other member to limit the swinging movement thereof after said connecting pivot has passed said line, and a rib extending lengthwise along said finger to afford a stiffening element therefor.

4. A support for a cleaning implement comprising two spring arms connected at one end, a toggle spreader comprising two members both of trough shape with ears on the side of one located between the side parts of the other, a pivot passing through said ears to pivotally connect said members at their adjacent ends, said members being arranged to permit the pivot connecting them to pass to the opposite sides of a line passing through pivots at their opposite ends, said pivots comprising sockets formed from extensions of the bottoms of each of said trough shaped members and adapted to receive said spring arms for connection thereto, and a finger comprising an extension from the bottom of one of said members at the end opposite the socket therein and adapted to engage the other member to limit the swinging movement thereof after said connecting pivot has passed said line.

5. A support for a cleaning implement comprising spring arms united by a U-shaped bend at one end and having outturned fingers at the opposite ends, said arms being normally in relatively disengaging relation with respect to the cleaning implement, a toggle spreader comprising two members pivotally connected at their adjacent ends, the opposite end of each of said members being extended and bent into a loop to pivotally engage one of said spring arms, said members being arranged to permit the pivot connecting them to pass to opposite sides of a line extending through said pivots at their opposite ends, and means for limiting the swinging movement of said arms after they have passed said line.

EDMUND S. SARGENT.